(12) United States Patent
Goldblatt et al.

(10) Patent No.: US 7,914,750 B2
(45) Date of Patent: Mar. 29, 2011

(54) CONTINUOUS REACTOR SYSTEM FOR ANOXIC PURIFICATION

(75) Inventors: Scott D. Goldblatt, Spruce Pine, NC (US); Chris Capobianco, Asheville, NC (US); Thomas A. Gallo, Asheville, NC (US)

(73) Assignee: Unimin Corporation, New Canaan, CT (US)

( * ) Notice: Subject to any disclaimer, the term of this patent is extended or adjusted under 35 U.S.C. 154(b) by 0 days.

(21) Appl. No.: 12/574,924

(22) Filed: Oct. 7, 2009

(65) Prior Publication Data

US 2010/0028239 A1 Feb. 4, 2010

Related U.S. Application Data

(62) Division of application No. 11/370,309, filed on Mar. 8, 2006, now abandoned.

(51) Int. Cl.
*B01J 8/08* (2006.01)
*B01J 19/00* (2006.01)
*B01D 12/00* (2006.01)
*C01B 33/12* (2006.01)

(52) U.S. Cl. ........ 422/209; 422/224; 422/225; 422/270; 422/271; 422/272; 423/335; 423/340

(58) Field of Classification Search .................. 422/209, 422/224, 225, 270, 271, 272; 423/335, 340
See application file for complete search history.

(56) References Cited

U.S. PATENT DOCUMENTS

| | | |
|---|---|---|
| 4,504,452 A | 3/1985 | Frevel |
| 4,956,059 A | 9/1990 | Englisch et al. |
| 5,487,938 A | 1/1996 | Spencer et al. |
| 5,525,231 A | 6/1996 | Ho et al. |
| 5,637,284 A | 6/1997 | Sato |
| 5,762,672 A | 6/1998 | Ikeda |
| 5,917,103 A | 6/1999 | Watanabe |
| 6,030,534 A | 2/2000 | De Lima |
| 6,190,554 B1 | 2/2001 | Mandt |
| 6,398,957 B1 | 6/2002 | Mandt |
| 6,510,707 B2 | 1/2003 | Kemmochi |
| 6,548,131 B1 | 4/2003 | Fabian |
| 6,672,107 B2 | 1/2004 | Werdecker |
| 6,676,836 B2 | 1/2004 | Mandt |
| 6,747,113 B1 | 6/2004 | Spencer et al. |
| 6,755,049 B2 | 6/2004 | Korus |
| 6,761,865 B1 | 7/2004 | Gallup et al. |

(Continued)

FOREIGN PATENT DOCUMENTS

WO WO 00/68147 11/2000

OTHER PUBLICATIONS

Reade Advanced Materials, "Silicon Dioxide/Silica/Quartz Powder," 3 pp., 1997, at http://www.reade.com/Products/Oxides/silica.html.
Ceram Research Ltd., "Silica- Silicon Dioxide," 6 pp., 2000-2005, at http://www.azom.com/details.asp?ArticleID=1114.
Wikipedia, "Silicon dioxide," 2 pp., last visited Oct. 26, 2005, at http://en.wikipedia.org/wiki/Silica.

(Continued)

*Primary Examiner* — Walter D Griffin
*Assistant Examiner* — Lessanework Seifu
(74) *Attorney, Agent, or Firm* — Rankin, Hill & Clark LLP (57) ABSTRACT

A continuous process and related system for producing high purity silica are disclosed. The process and system utilize a unique high temperature rotary reactor which excludes oxygen. The use of one or more anoxic gases is described, that upon administration into the system promote the exclusion of oxygen.

27 Claims, 5 Drawing Sheets

U.S. PATENT DOCUMENTS

| | | |
|---|---|---|
| 6,841,210 B2 | 1/2005 | Ohama |
| 6,916,370 B2 | 7/2005 | Watanabe |
| 6,938,443 B1 | 9/2005 | Fabian |
| 7,118,789 B2 | 10/2006 | Kemmochi |
| 2003/0012899 A1 | 1/2003 | Kemmochi |
| 2003/0106491 A1 | 6/2003 | Kemmochi |
| 2004/0072007 A1 | 4/2004 | Kemmochi |
| 2006/0236916 A1 | 10/2006 | Ohama |

OTHER PUBLICATIONS

"Types of silica sand used in making glass," Appendix 4.1, pp. 111-113.

"Silica Sand," Arkansas Geological Commission, 1 p., last visited Oct. 26, 2005, at http://www.state.ar.us/agc/silica.htm.

"Making Silicon from Sand," Popular Science, 1 p., 2005.

U.S. Dept. of Energy, "Silica Sand and Jell," Newton BBS, 1 p., last visited Oct. 26, 2005, at http://www.newton.dep.anl.gov/askasci/chem99/chem99516.htm.

CONTINUOUS REACTOR SYSTEM FOR ANOXIC PURIFICATION

The present invention is a divisional of U.S. application Ser. No. 11/370,309 filed Mar. 8, 2006 now abandoned.

BACKGROUND OF THE INVENTION

The present invention relates to a system for the continuous production of high purity silica, related methods, and the silica product produced therefrom. The invention finds particular application in conjunction with the production of ultra high purity synthetic silica, and will be described with particular reference thereto. However, it is to be appreciated that the present invention is also amenable to other like applications.

Exclusion of oxygen during high temperature processing i.e., anoxic processing, of synthetic silica enables production of a silica material with two important properties: ultra high purity, and low hydroxyl content. Previously, anoxic processing methods have been limited to batch reactors in which rigorous exclusion of ambient oxygen-bearing gasses can be accomplished. Although somewhat satisfactory, batch reactors are limited in their ability to economically produce a price competitive silica product. Accordingly, it would be desirable to provide a continuous anoxic reactor, related system and process for producing an ultra high purity synthetic silica product.

Due to the relatively high temperatures involved in a silica purification process, it is generally quite difficult to exclude oxygen from the reaction environment. A prime source of oxygen is from ambient air which tends to be drawn into the reactor as a result of the draft resulting from the high temperatures within the interior of the reactor. This difficulty in sealing the interior of the reactor from the atmosphere is further compounded due to the rotation of the reactor, which is typically quartz glass. Accordingly, a need exists for a strategy by which to exclude oxygen or at least significantly prevent entry of air, into a rotating high temperature reactor.

In addition, in the production of synthetic silica, it is necessary to produce reducing conditions in the reactor in order to form stable volatile chlorides that can be subsequently removed. It is difficult to maintain sufficiently reducing conditions in a rotating high temperature system. Accordingly, it would be desirable to provide a rotating high temperature reactor that can maintain sufficiently reducing conditions such that certain chlorides present in the production of synthetic silica can be readily removed from the reactor.

SUMMARY OF THE INVENTION

In a first aspect, the present invention provides a system for the continuous production of high purity silica. The system comprises a reactor and furnace assembly including a rotary tube reactor defining a first end, a second opposite end, and a heated wall extending at least partially between the first and second ends. The first and second ends and wall define an interior reaction region. The assembly includes a silica feed end proximate the first end and a process gas feed end proximate the second end. The system also comprises a source of silica feed in communication with the first end of the assembly. The system also comprises a source of at least one process gas in communication with the second end of the assembly. And, the system comprises a source of anoxic gas in communication with at least one of the first and second ends of the assembly. Upon transfer of the silica feed to the silica feed end, transfer of the process gas to the process gas feed end, transfer of the anoxic gas to the assembly, and operation of the reactor and furnace assembly at conditions suitable for producing high purity silica, the anoxic gas is present within the interior reaction region, thereby enabling the continuous production of the high purity silica.

In yet another aspect, the present invention provides a reactor and furnace assembly adapted for the continuous production of high purity silica. The assembly comprises a rotatable tubular reactor defining a first end adapted for receiving silica feed, a second opposite end, and a reactor wall extending between. The assembly also comprises a furnace extending at least partially along the reactor wall and adapted to heat the reactor interior. The assembly also comprises a first reactor plate disposed within the reactor and positioned proximate the first end. The first reactor plate defines a collection of members that extend outwardly from the plate toward the first end of the reactor. The first reactor plate also defines an opening adjacent each member. The assembly also comprises a second reactor plate disposed within the reactor and positioned proximate the second end. The second reactor plate defines a collection of members that extend outwardly from the plate toward the first end of the reactor. The second reactor plate also defines an opening adjacent each member. Upon rotation of the reactor, the first and second reactor plates rotate with the reactor.

In yet another aspect, the present invention provides a process for the continuous production of high purity silica in a rotatable reactor. The process comprises providing a rotatable reactor having a silica feed and a process gas feed, each in communication with the reactor. The process also comprises heating the interior of the reactor to a temperature of from about 900 to about 1400° C. The process further comprises administering a silica feed including impurities to the silica feed of the reactor. The process also comprises providing at least one anoxic gas to the process gas feed. The process also includes rotating the reactor such that silica feed is transferred to the heated interior of the reactor. The process further comprises introducing at least one anoxic gas into the interior of the reactor to thereby at least partially exclude oxygen therefrom. The silica feed and at least one anoxic gas are retained within the heated interior of the reactor for a sufficient time such that impurities in the silica feed react with at least one process gas and volatize thereby leaving high purity silica.

DETAILED DESCRIPTION OF THE INVENTION

The present discovery enables continuous anoxic processing in the production of high purity synthetic silica. The discovery is based upon identification of a unique set of reactor characteristics and features and new modes of operation with respect to gas control. These novel features permit exclusion of ambient atmosphere from a rotating reactor.

The present discovery provides a reactor having multiple reaction chambers or zones that prevent drawing oxygen into the reaction environment. This enables environmental oxygen to be excluded. The reaction chambers preferably utilize quartz glass plates having a particular configuration to allow synthetic silica grain to enter and exit and minimal environmental gasses to enter. Preferably, three such plates are used in conjunction within a rotating tubular reactor to provide a reaction environment, which can sufficiently exclude oxygen from entering the critical reaction zone.

Environmental oxygen exclusion is also achieved by purging a silica feed grain with an anoxic gas, such as for example, nitrogen. The anoxic gas replaces oxygen that is entrained in the porous grain. Removal of oxygen at this stage allows accelerated micro-contaminant removal since oxygen is not available to bind with those contaminants. Also, the anoxic gas is preferably introduced into the feed chamber to ensure oxygen is not intentionally re-introduced into a gas feed.

Injection of an anoxic gas, such as nitrogen, downstream of the reaction chamber, also allows for further reduction of environmental oxygen by providing a positive pressure on the exit end of the reactor. The anoxic gas excludes oxygen from being drawn into the high temperature gas by application of a slight positive pressure on the discharge zone. This slight pressure of inert gas forces gases from the discharge zone, thus further excluding oxygen.

Operation of the preferred reactor system is conducted in a manner in which the synthetic silica grain is exposed to progressively hotter temperatures. This "zoned" temperature profile ensures the grain has ample time to out-gas volatile contaminants while slowly reducing the effective surface area of the grain. Slow surface area reduction allows for excellent purification while minimizing potential collapse of the surface onto the micro contaminants.

Figure 1:
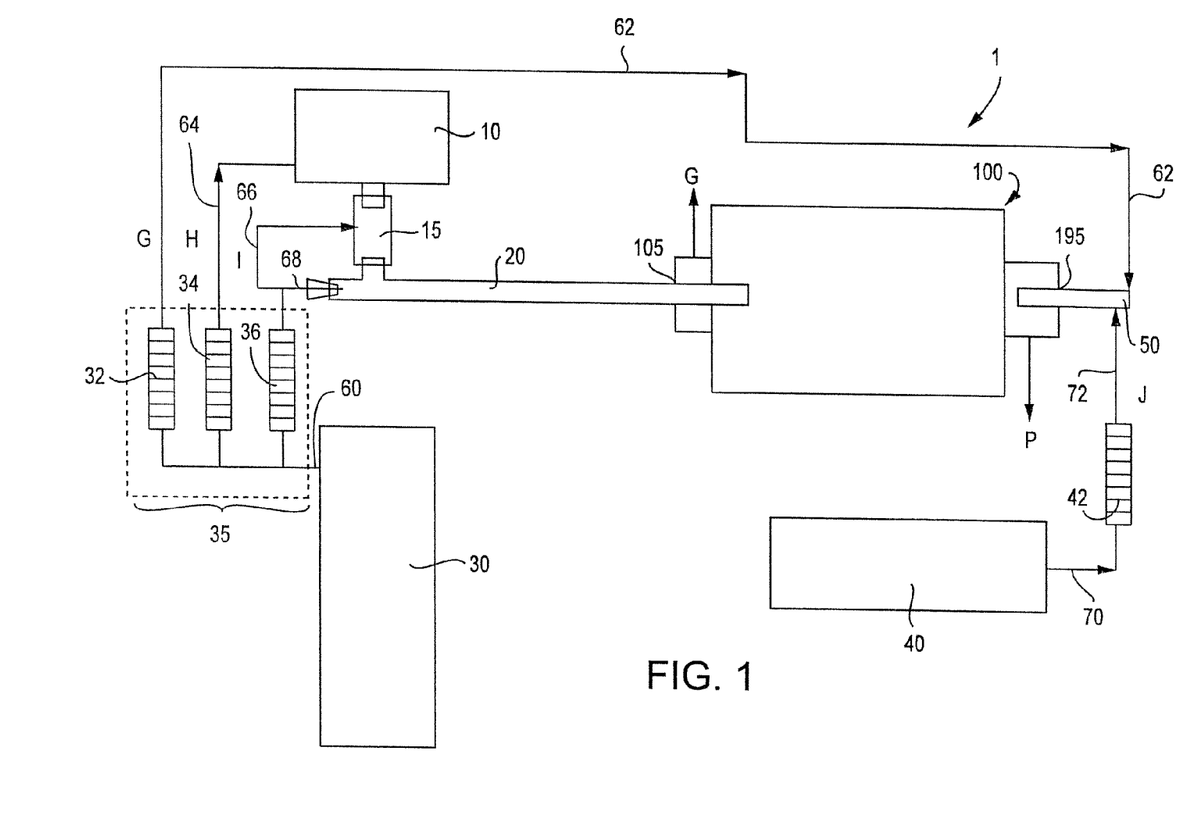
FIG. 1 is a process schematic of a preferred embodiment system according to the present invention.

FIG. 1 illustrates a preferred embodiment of system 1 according to the present invention. The preferred system 1 comprises a grain feed hopper 10 in flow communication with a grain feed tube 20. The grain feed hopper 10 transfers its contents to the grain feed tube 20 through a grain transfer tube 15 to a furnace and reactor assembly 100. The preferred system 1 also comprises an anoxic gas feed such as a nitrogen feed 30 which administers nitrogen from a discharge 60 into one or more flow lines through a nitrogen distribution manifold 35. Preferably, a plurality of nitrogen flow meters such as flow meters 32, 34, and 36, are provided in communication with the distribution manifold 35. Nitrogen feed lines 62, 64, 66 and 68 deliver the inert gas to various locations in the system 1. Flow line 62 transfers nitrogen to a dual gas and radial injection unit 50 which is in flow communication with the furnace and reactor assembly 100. Flow line 64 transfers nitrogen to the grain feed hopper 10. Flow line 66 transfers nitrogen to the grain transfer tube 15. And, flow line 68 transfers nitrogen to the grain feed tube 20.

The preferred embodiment system 1 also comprises an anhydrous hydrogen chloride feed 40 as the source of the process gas. Preferably provided at the exit of the feed 40 is a flow meter 42. A gas feed line 70 transfers the hydrogen chloride from feed 40 to the flow meter 42. And, a second gas feed line 72 transfers the hydrogen chloride from the flow meter 42 to the dual gas input and radial injection unit 50. In addition to or instead of the hydrogen chloride, it is contemplated that one or more other process gasses could be used.

Silica grain is fed from the grain feed hopper 10 through the transfer tube 15 and into the feed tube 20 toward a grain feed inlet 105 of the furnace and reactor assembly 100. Similarly, nitrogen and anhydrous hydrogen chloride are fed through flow lines 62 and 72 into the dual gas input and radial injection unit 50 at which the gases enter a gas feed 195 of the furnace and reactor assembly 100. High purity silica product exits the reactor 100 as product P. And gas stream G exits the other end of the reactor as shown in FIG. 1. The gasses in stream G are preferably drawn off as a vapor and then directed to a scrubber for removal of contaminants. Purified anoxic gas, such as nitrogen can be reintroduced into the system 1.

Preferably, the silica feed and the high purity silica product are amorphous. However, the present invention includes the use of crystalline silica feed and the production of a high purity crystalline silica product. Preferably, each of the silica feed and high purity silica product have a specific surface area of from about 40 $m^2/g$ to about 250 $m^2/g$. Generally, silica grain enters the reactor relatively porous and exits less porous. The high purity silica and specifically, the ultra-high purity silica produced from the system and process described herein preferably contain relatively low concentrations of one or more of sodium, iron, copper, nickel, chromium, manganese, and lithium. Preferably, the silica product produced as described herein exhibits one or more of the following purity concentration levels:

| Element | Preferable Concentration Less Than | Most Preferable Concentration Less Than |
|---|---|---|
| Na | 10 ppb | 5 ppb |
| Fe | 70 | 20 |
| Cu | 20 | 1 |
| Ni | 20 | 1 |
| Cr | 20 | 1 |
| Mn | 30 | 5 |
| Li | 50 | 5 |

It will be understood that ppb refers to mass fraction unless stated otherwise.

Generally, the purification process occurs by chlorination and volatilization of the chlorinated impurities. The impurities may be present as nearly any chemical species, such as for example, oxides, metals, or other non-volatile salts.

A key feature of the preferred embodiment system and process is maintaining a non-oxidizing atmosphere within the reactor, in a continuous high temperature reactor system. Without the anoxic atmosphere, certain impurities could likely not be removed from the silica feed, and specifically, those that form very stable oxides, such as Al, Ti, and Zr.

In maintaining an anoxic atmosphere within the reactor, impurities in the silica feed are chlorinated and volatilized and then can be removed from the reaction environment. For example, metal oxides MX in the silica feed combine with the hydrogen chloride HCl reducing agent as follows:

When HCl is utilized as the process gas, the portion of the HCl that reacts generally forms a chlorinated product as previously noted, e.g. MCl, but can also form $Cl_2$ and $H_2$ gases. Additionally, it is expected that a slight amount of chlorine may remain in the silica product.

As previously explained, it is desirable to exclude oxygen from the reaction environment. The presence of oxygen promotes the formation of relatively stable, and difficult to remove, metal oxides. In addition, oxygen present in the reaction environment can react with HCl to form ClO and $ClO_2$. Cl species can subsequently form $Cl_2$ gas. Another product which can form in the reaction environment if oxygen is present is $H_2O$.

Figure 2:
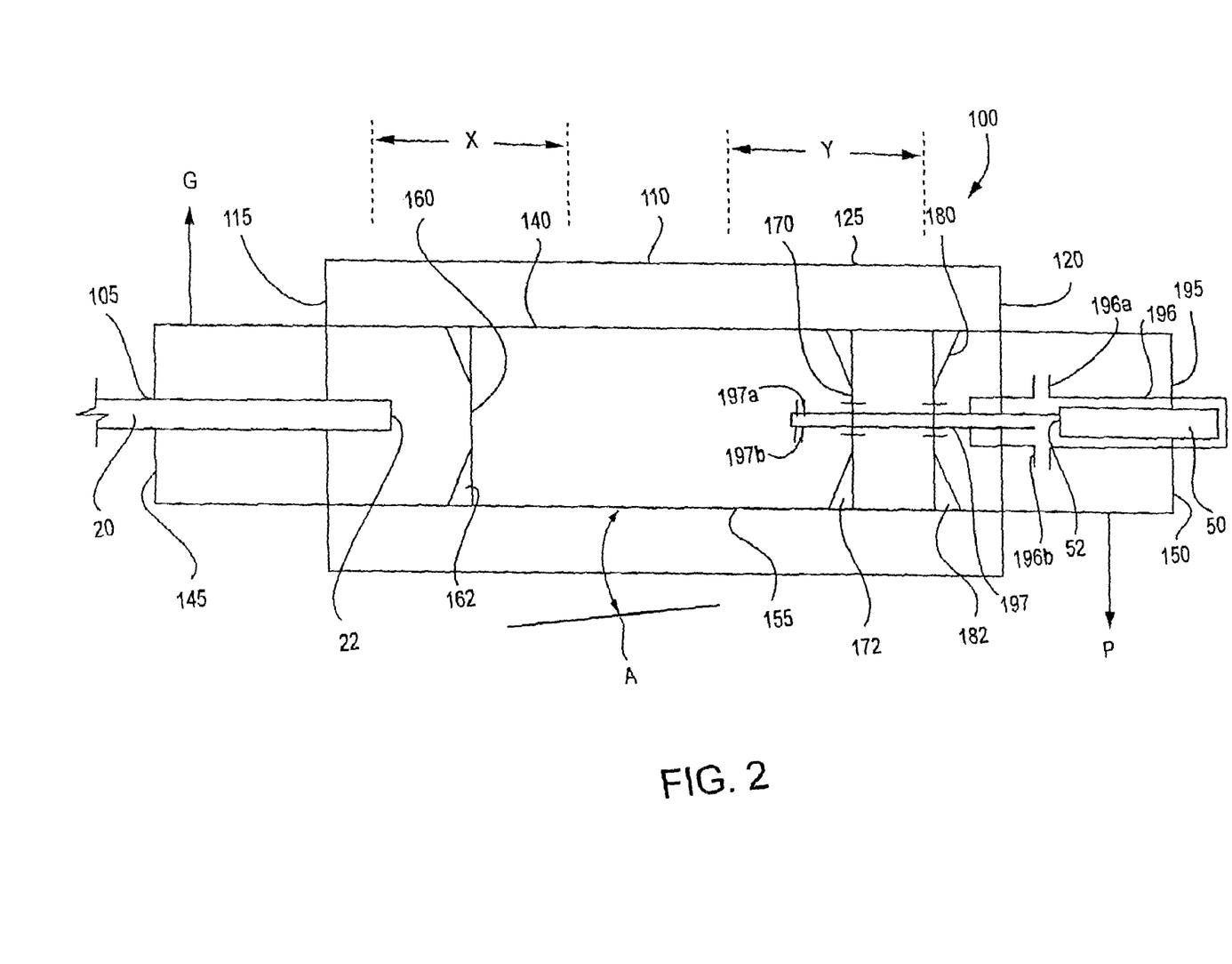
FIG. 2 is a schematic of a furnace and reactor assembly used in the preferred embodiment system depicted in FIG. 1.

FIG. 2 schematically illustrates a furnace and reactor assembly 100 used in the preferred system 1 shown in FIG. 1. The furnace and reactor assembly 100 includes the grain feed 105 located at a first end of the assembly and the gas feed 195 located at an opposite end of the assembly. The furnace and reactor assembly 100 includes a furnace 110 having a first end 115, a second opposite end 120, and one or more furnace walls 125 extending between the first and second ends. The furnace and reactor assembly 100 also includes a rotary tubular reactor 140. The tubular reactor includes a first end 145, a second end 150 opposite from the first end 145, and a reactor wall 155 which is preferably circumferential such that when viewed in cross section, the reactor 140 is circular in shape. The grain feed tube 20 is in communication with the grain feed 105 of the assembly 100 and preferably extends to, or past the first end 115 of the furnace 110. Grain feed is transferred from the grain feed hopper 10 through the feed tube 20, and enters the interior of the reactor 140 upon exiting the distal end 22 of the feed tube 20. Similarly, the gases enter the reactor 140 through a distal end 52 of the dual gas input and radial injection unit 50. FIG. 2 illustrates the use of an optional and preferred dual gas injector assembly 196, described in greater detail herein.

Preferably, the furnace and reactor assembly 100 also comprises a plurality of reactor plates. Preferably, three reactor plates are used as follows. Referring further to FIG. 2, a first reactor plate 160 is disposed proximate the first end 115 of the assembly. The assembly also preferably comprises second and third reactor plates 170, 180, respectively, which are preferably located near the second end of the assembly. Each reactor plate preferably includes a plurality of fins, such as plate 160 includes fins 162, plate 170 includes fins 172, and plate 180 includes fins 182. Although three reactor plates are described, it will be appreciated that the present invention includes the use of a lesser number of reactor plates, such as two, or in certain configurations, one plate; and also includes the use of a greater number of reactor plates, such as four, five, six, or more. The particular number of reactor plates utilized depends upon a host of factors such as, for example, the configuration and size of the reactor, the desired throughput or rate of processing of feed, the configuration of each of the reactor plates, and the placement and orientation of each reactor plate in the reactor. Specifics of the preferred embodiment reactor plates are described in greater detail herein. Referring again to FIG. 2, it will be appreciated that the reactor end 115 can be in the form of an end plate. And, similarly, the reactor end 120 can be in the form of an end plate. Preferably, each end plate is configured to allow passage of feed agent(s), and product therethrough.

Preferably disposed proximate the gas feed end 195 of the reactor 140 is a dual gas injector assembly 196. This assembly can include or be used instead of the radial injection unit 50. The assembly 196 comprises a longitudinal member 197 that projects toward the interior of the furnace and reactor assembly 100. The dual gas injector assembly 196 includes one or more anoxic gas outlets such as 196a and 196b. These gas outlets are preferably defined near the gas feed end 195, and within the interior of the reactor 140. The assembly 196 also includes one or more process gas discharges such as for example, 197a and 197b. These discharges are preferably located within the interior of the reactor 140 and the interior of the furnace 110, and most preferably disposed between the reactor plates 160 and 170. The assembly 196 receives process gas from a process gas feed line such as flow line 72 depicted in FIG. 1, and anoxic gas from a feed line such as flow line 62 in FIG. 1.

The tubular reactor 140 is preferably oriented at an angle A as shown in FIG. 2. Although not necessary, it is also preferred that the furnace 110 also be oriented at this same angle to promote uniform heat distribution at corresponding regions of the tubular reactor 140. It will be noted that the first end 145 of the reactor 140, at which grain enters the assembly 100, is disposed at a higher elevation than opposite end 150, i.e. the gas feed end 195. As counter current flow occurs within the reactor assembly 100 between the grain feed and the gas feed, gravity promotes transfer of the grain feed from the first end 145 to the opposite end 150 of the reactor 140. Similarly, the counter current flowing gases generally tend to rise upward and so their transfer through the assembly 100 is promoted due to the angle of inclination A. The angle of inclination A is dependent upon several factors, however is primarily dictated by the desired residence time for grain feed entering the reactor 140. For the system 1 illustrated in FIG. 1, the angle A is preferably about 1.2 degrees, however, may range from about 0.5 to about 10 degrees from horizontal depending upon the process parameters and equipment configurations. Restated, the axis of rotation of the rotary reactor is also similarly oriented with respect to horizontal.

As will be appreciated, the residence time for grain feed entering the reactor 140 depends upon various factors, primarily relating to the bulk density of the material within the reactor, the feed rate, and the rate of rotation of the reactor. Additional factors can include the type and quality of feed and desired product. For the preferred system described herein, a residence time of about 45 minutes has been found to be acceptable. However, it will be understood that the residence time may vary, such as from about 15 minutes to about 120 minutes or longer, depending upon the temperature(s) within the reactor, the internal configuration within the reactor, the angle of inclination A, and the rate of rotation of the reactor 140.

As noted, the reactor 140 of the furnace rotates. The rotation is about the longitudinal axis of the reactor 140. The rotation promotes transfer or rather movement, of grain feed through the reactor from one end to another, such as from end 145 to the opposite end 150. Preferably, displacement of grain feed through the reactor occurs by gravity feed. Although a wide array of rates of rotation of the reactor may be utilized, generally for the system and reactor assembly described herein, a range of from about 0.5 to about 12 revolutions per minute (RPM) is preferred.

Typical operating temperatures within the reactor 140 depend upon the characteristics of the grain feed entering the reactor, the desired residence time, and the particular reactions within the reactor 140. However, generally, for the system 1 shown in FIG. 1 and described herein, the operating temperature within the reactor 140 ranges from about 900 to about 1400° C., and preferably from about 1065 to about 1200° C. If excessively high temperatures are used within the interior of the reactor, the silica grains or particles tend to stick to one another, which is undesirable. The temperature at the end of the reactor 140 which receives grain feed is preferably lower than the temperature at the opposite end of the reactor 140, at which the gases enter. Preferably, a zoned heating profile is utilized across the length of the reactor. Generally extending along or near the silica feed end of the reactor, is a lower temperature chlorination stage. And, generally extending along or near the gas feed end of the reactor, is a higher temperature volatilization stage, such as where the chlorinated species are volatilized. Referring to FIG. 2 for example, the chlorination stage is represented as region X and the volatilization stage is represented as region Y.

Although the present invention includes a wide array of reactors and reactor configurations, generally, a cylindrical reactor with provisions for rotation while undergoing heating is preferred. An example of a typical tubular heated reactor is one having an internal diameter of about 0.5 to about 2 feet, an overall length of about 12 feet, with a hot zone of about 8 feet. It will be understood by those skilled in the art that the particular dimensions of the reactor 140 will depend upon process and equipment parameters.

Figure 3:
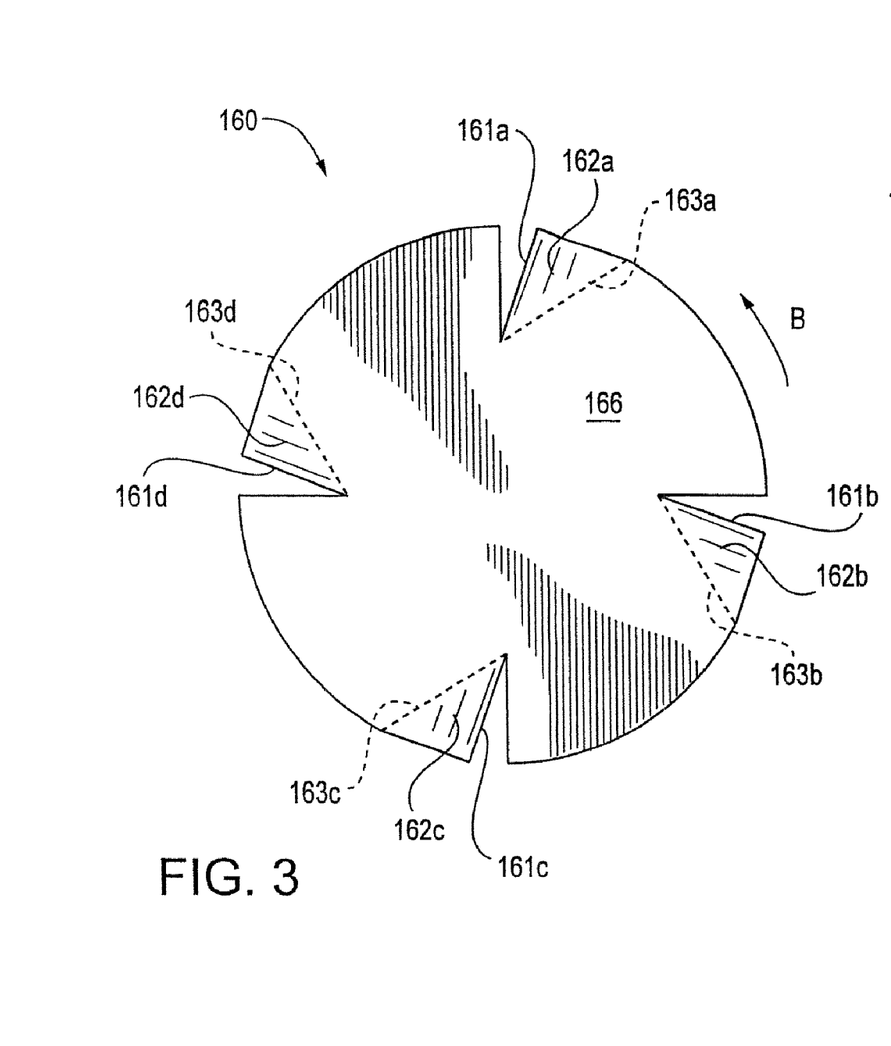
FIG. 3 is a front view of a preferred embodiment reactor plate used in the assembly depicted in FIG. 2.
Figure 4:
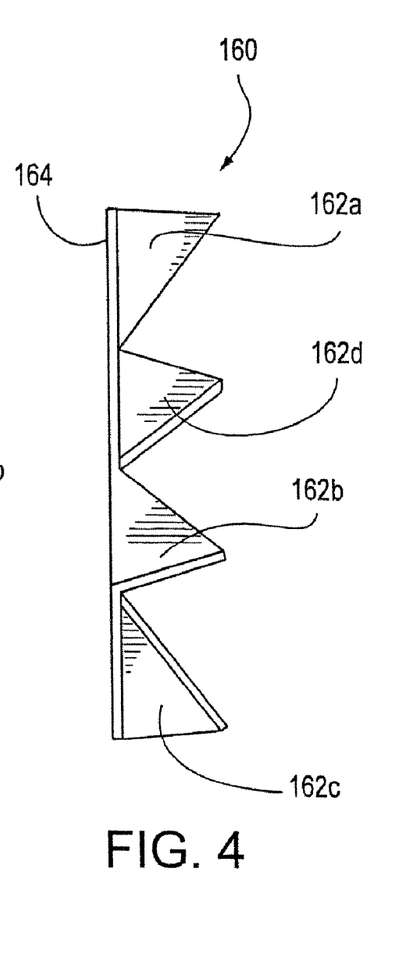
FIG. 4 is a side view of the reactor plate of FIG. 3.

FIGS. 3 and 4 illustrate a preferred first reactor plate 160. The first reactor plate 160 comprises a collection of fins such as fins 162*a*, 162*b*, 162*c*, and 162*d*. Each fin extends from an edge line 163 and defines a distal edge 161. Thus, for example, for fin 162*a*, the fin extends along edge line 163*a* and provides a distal edge 161*a*. The reactor plate 160 defines a first face 164 and a second oppositely directed face 166. It will be noted that preferably, all fins 162*a*, 162*b*, 162*c*, and 162*d* extend in the same direction and outwardly from the face 166.

Figures 5, 6:
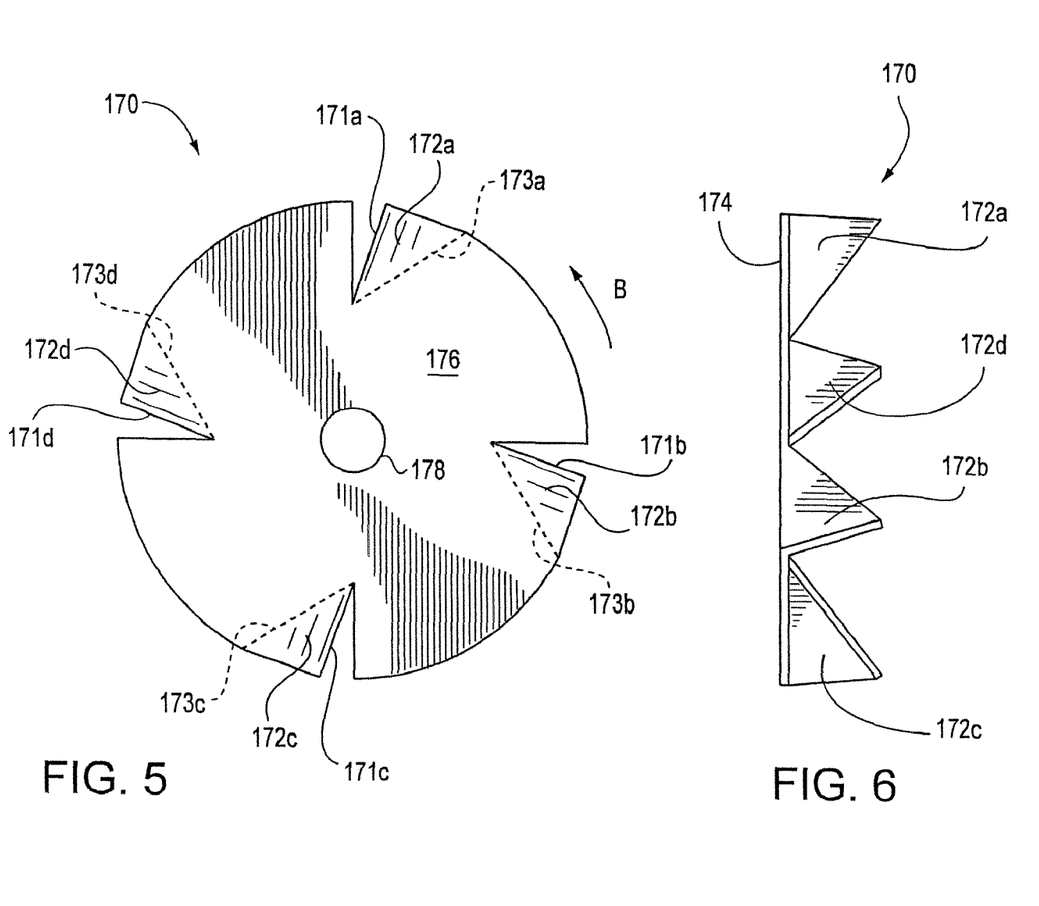
FIG. 5 is a front view of a second reactor plate used in the reactor assembly of FIG. 2.
FIG. 6 is a side view of the reactor plate shown in FIG. 5.

FIGS. 5 and 6 illustrate a preferred second reactor plate 170. The second reactor plate 170 comprises a collection of fins such as fins 172*a*, 172*b*, 172*c*, and 172*d*. Each fin extends from an edge line 173 and defines a distal edge 171. Thus, for example, for fin 172*a*, the fin extends along edge line 173*a* and provides a distal edge 171*a*. The reactor plate 170 defines a first face 174 and a second oppositely directed face 176. All fins 172*a*, 172*b*, 172*c*, and 172*d* extend in the same direction and outwardly from the face 176. The second reactor plate 170 also defines a centrally located aperture 178. The aperture 178 is described in greater detail herein.

Figure 7:
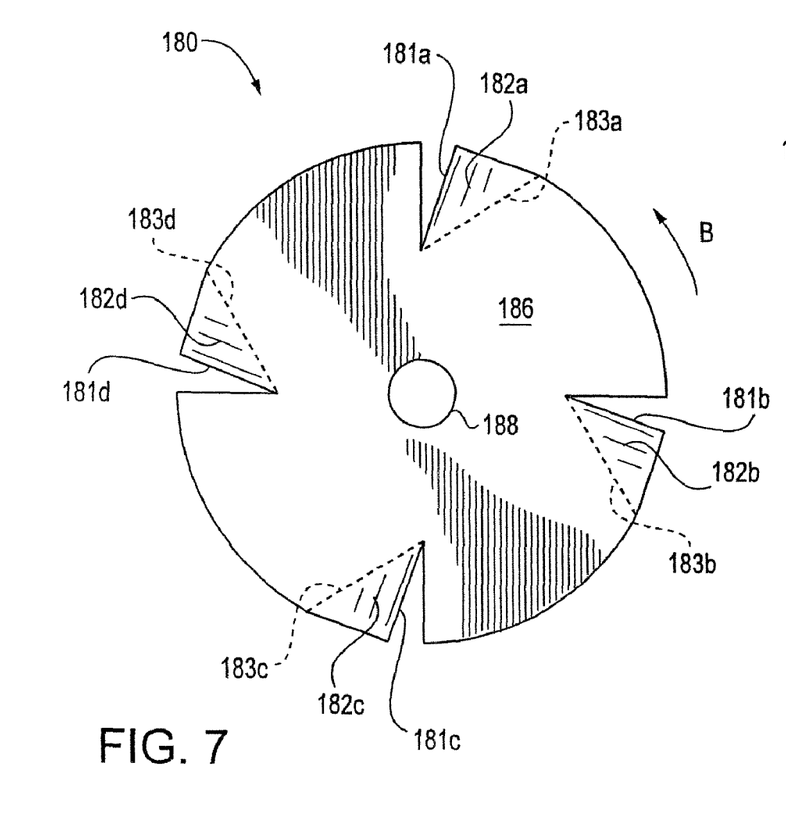
FIG. 7 is a front view of a third reactor plate used in the reactor assembly illustrated in FIG. 2.
Figure 8:
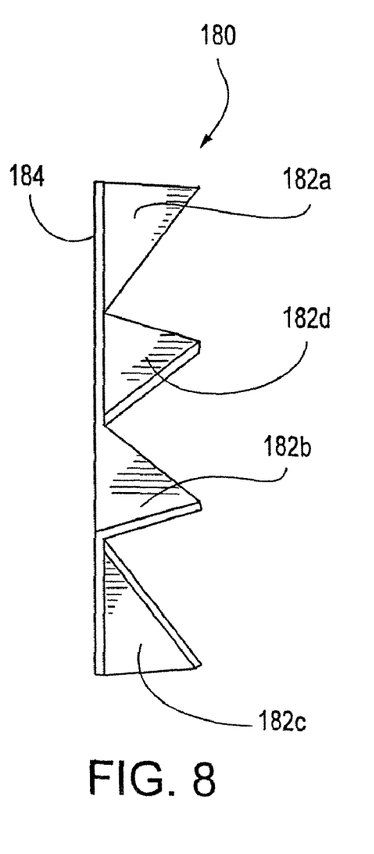
FIG. 8 is a side view of the third reactor plate depicted in FIG. 7.

FIGS. 7 and 8 illustrate a preferred third reactor plate 180. The third reactor plate 180 comprises a collection of fins such as fins 182*a*, 182*b*, 182*c*, and 182*d*. Each fin extends from an edge line 183 and defines a distal edge 181. Thus, for example, for fin 182*a*, the fin extends along edge line 183*a* and provides a distal edge 181*a*. The reactor plate 180 defines a first face 184 and a second oppositely directed face 186. All fins 182*a*, 182*b*, 182*c*, and 182*d* extend in the same direction and outwardly from the face 186. The third reactor plate 180 also defines a centrally located aperture 188, which is described in greater detail herein.

Preferably, each of the reactor plates defines a plurality of outwardly extending fins. And, each reactor plate also defines a plurality of openings, each opening being adjacent to a corresponding fin. Although the reactor plates are described herein as utilizing outwardly extending fins, it will be appreciated that the reactor plates may utilize outwardly extending members of nearly any shape. Furthermore, the noted openings, each defined alongside a corresponding fin or member are preferably the result of the fin or member being partially severed from the remaining portion of the reactor plate and projecting outward therefrom.

Referring again to FIG. 2, the preferred furnace and reactor assembly 100 is depicted as utilizing three reactor plates, i.e. reactor plates 160, 170, and 180. Two of the plates are oriented within the reactor 140 such that the fins extend toward the end of the reactor at which grain feed enters. The last plate 180 is oriented with fins projecting toward the discharge end. In addition, each plate is preferably secured to the interior surface of the reactor wall 155. Each fin is oriented at right angles to the longitudinal axis of the reactor 140. Furthermore, it will be noted that the reactor plate not having a centrally disposed aperture, i.e. the first reactor plate 160, is positioned nearest the end of the reactor at which grain feed enters. The other two reactor plates having centrally disposed apertures, i.e. reactor plates 170 and 180, are located near the end of the reactor at which the grain feed exits, and the gases enter. The centrally disposed apertures in reactor plates 170 and 180 can be of the same size and shape, or may differ from one another. Preferably, each aperture has a diameter of from about 0.5 to about 1.0 inch, for a plate having a diameter of from about 6 to about 9 inches. This particular arrangement of reactor plates in the reactor 140 has been discovered to promote steady and constant material transfer through the reactor, while enabling desired residence times and sufficient heating of feed to occur.

As previously noted, a significant feature of the present invention is the use of one or more anoxic gases in the system 1 shown in FIG. 1, namely, to exclude oxygen from the reaction environment within the reactor 140. A wide array of anoxic gases can be used, such as for example nitrogen, helium, neon, argon, mixtures thereof, and so forth. Nitrogen is preferred. Thus, other gaseous agents could also be used instead of, or in addition to, nitrogen, so long as those agents did not detrimentally react or otherwise interfere within the reaction zone.

In the preferred system 1 illustrated in FIG. 1, particular flow rates of the anoxic gas, i.e. nitrogen, and the process gas, i.e. anhydrous hydrogen chloride, are utilized as follows. In transfer line 62, the preferred nitrogen flow rate G is from about 1.7 to about 6.9 lbs/hr. In transfer line 64, the preferred nitrogen flow rate, H, is from about 300 to about 1,000 sccm (standard $cm^3$). In transfer line 66, the preferred nitrogen flow rate, I, is from about 200 to about 400 sccm. And, in transfer line 72, the preferred flow rate, J, for the anhydrous hydrogen chloride is from about 4.5 to about 9 lbs/hr. It will be appreciated however, that the present invention process includes different flow rates of these or other agents.

Preferably, both the source of the anoxic gas and the source of the reducing agent(s), are at pressures above atmospheric pressure. For example, the pressure of each source, for example sources 30 and 40 depicted in FIG. 1 can be from about 16 to about 30 psi gauge and preferably at about 22 psi gauge. The pressure of the entering gas that flows to the reactor, such as measured at feed inlets 105 and 195 shown in FIGS. 1 and 2, is generally only slightly above atmospheric pressure, such as from about 1 to about 5 psi gauge. As will be appreciated by those skilled in the art, the specific pressures of the gas feed(s) are such that the feed pressure is sufficient to overcome the cumulative pressure drop as measured between a respective feed and corresponding inlet of the reactor, or other desired location within the system. The pressure of the anoxic gas, once within the interior of the reactor, is from about 0 to about 1 psi gauge.

The preferred embodiment system, such as described herein and as depicted in FIG. 1, generally includes a reactor and furnace assembly. This assembly can utilize a rotatable rotary tube reactor which has a first end, a second opposite end, and a heated wall region which extends between the first and second ends. Defined within the reactor is an interior reaction region. The reactor and furnace assembly also includes a feed end which is adapted for receiving silica feed such as silica grain, near or adjacent to the first end of the assembly, and a process gas feed end which is near or adjacent to the second end of the assembly. The system also includes a source of silica feed which is in communication with the first end of the reactor and furnace assembly. The transfer assembly can utilize a conveyor or screw feed system as known in the art. As will be appreciated, a transfer assembly is used to preferably continuously transfer the silica feed to the silica feed end of the reactor and furnace assembly. The preferred embodiment system also includes a source of at least one process gas which is in communication with the second end, i.e. the gas feed end, of the reactor and furnace assembly. The system also includes a source of anoxic gas, such as nitrogen which is in communication with at least one of the first and second ends of the reactor and furnace assembly. Preferably, the anoxic gas is in flow communication with both ends of the assembly. Upon transfer of the silica feed to the silica feed end of the reactor assembly, transfer of the process gas to the gas feed end of the reactor assembly, and transfer of the anoxic gas to the reactor assembly, and furthermore, upon operation of the reactor and furnace assembly at conditions suitable for producing high purity silica, the anoxic gas is present within the interior reaction region of the reactor, thereby excluding oxygen and enabling the production of high purity silica. Preferably, the anoxic gas is present within the interior region of the reactor at a pressure greater than atmospheric pressure. This promotes the exclusion of oxygen from the interior reaction region.

Results of Testing

A series of trials were conducted in which various aspects of the present invention were investigated. The results of these trials and investigations are set forth as follows. Elemental analysis was performed by inductively coupled plasma (ICP) spectrophotometry. ICP measurements expressed herein are noted as parts per million by weight, i.e. ppm.

Gassing of Synthetic Grain Using Zone Heating

The following process parameters were used:
Temperature profile for reactor 1120, 1155, 1175° C.
Reactor rotation 1.0 rpm
Vacuum/Draft 0.06 to 0.07" $H_2O$
HCl flow 60% (9 pounds/hr)
Target grain rate 0.1 pounds/min.

Table 1 shows ICP data showing data from first observation in a continuous reactor of the transition from conventional to anoxic purification.

TABLE 1

ICP ANALYSIS OF CONVENTIONALLY AND ANOXICALLY PURIFIED GRAIN

| Sampling Sequence | Al | Ca | Cr | Cu | Fe | Ge | K | Li |
|---|---|---|---|---|---|---|---|---|
| 1 | 2.82 | 0.06 | 0.00 | 0.00 | 0.14 | 0.12 | 0.03 | 0.000 |
| 2 | 2.32 | 0.02 | 0.00 | 0.00 | 0.04 | 0.11 | 0.03 | 0.000 |
| 3 | 2.24 | 0.01 | 0.00 | 0.00 | 0.00 | 0.10 | 0.03 | 0.000 |
| 4 | 3.26 | 0.02 | 0.00 | 0.00 | 0.01 | 0.09 | 0.04 | 0.000 |
| 5 | 3.99 | 0.02 | 0.00 | 0.00 | 0.00 | 0.13 | 0.03 | 0.000 |
| 6 | 3.12 | 0.06 | 0.00 | 0.00 | 0.02 | 0.14 | 0.03 | 0.000 |
| 7 | 2.09 | 0.01 | 0.00 | 0.00 | 0.01 | 0.08 | 0.03 | 0.000 |
| 8 | 2.08 | 0.01 | 0.00 | 0.00 | 0.01 | 0.08 | 0.02 | 0.000 |
| 9 | 0.26 | 0.01 | 0.00 | 0.00 | 0.03 | 0.05 | 0.00 | 0.000 |
| 10 | 0.53 | 0.05 | 0.00 | 0.00 | 0.02 | 0.08 | 0.02 | 0.001 |
| 11 | 0.51 | 0.04 | 0.00 | 0.00 | 0.02 | 0.03 | 0.01 | 0.000 |
| 12 | 0.81 | 0.13 | 0.00 | 0.00 | 0.01 | 0.04 | 0.02 | 0.001 |
| 13 | 0.69 | 0.07 | 0.00 | 0.00 | 0.04 | 0.05 | 0.02 | 0.001 |
| 14 | 0.96 | 0.33 | 0.00 | 0.00 | 0.04 | 0.10 | 0.01 | 0.001 |
| 15 | 0.50 | 0.04 | 0.00 | 0.00 | 0.03 | 0.08 | 0.02 | 0.001 |
| 16 | 0.17 | 0.05 | 0.00 | 0.00 | 0.02 | 0.05 | 0.01 | 0.000 |

| Sampling Sequence | Mg | Mn | Na | Ni | P | Ti | Zn | Zr |
|---|---|---|---|---|---|---|---|---|
| 1 | 0.02 | 0.00 | 0.21 | 0.001 | 0.06 | 0.12 | 0.02 | 0.16 |
| 2 | 0.02 | 0.00 | 0.02 | 0.001 | 0.05 | 0.11 | 0.03 | 0.10 |
| 3 | 0.01 | 0.00 | 0.01 | 0.000 | 0.03 | 0.09 | 0.00 | 0.06 |
| 4 | 0.02 | 0.00 | 0.05 | 0.001 | 0.01 | 0.08 | 0.01 | 0.09 |
| 5 | 0.01 | 0.00 | 0.04 | 0.001 | 0.04 | 0.06 | 0.01 | 0.22 |
| 6 | 0.01 | 0.00 | 0.02 | 0.002 | 0.05 | 0.05 | 0.01 | 0.23 |
| 7 | 0.01 | 0.00 | 0.02 | 0.000 | 0.02 | 0.05 | 0.00 | 0.16 |
| 8 | 0.01 | 0.00 | 0.02 | 0.000 | 0.03 | 0.05 | 0.00 | 0.18 |
| 9 | 0.01 | 0.00 | 0.01 | 0.002 | 0.02 | 0.02 | 0.00 | 0.11 |
| 10 | 0.01 | 0.00 | 0.02 | 0.001 | 0.03 | 0.02 | 0.01 | 0.13 |
| 11 | 0.01 | 0.00 | 0.02 | 0.000 | 0.01 | 0.02 | 0.01 | 0.08 |
| 12 | 0.03 | 0.00 | 0.02 | 0.001 | 0.02 | 0.03 | 0.01 | 0.13 |
| 13 | 0.02 | 0.00 | 0.03 | 0.001 | 0.03 | 0.02 | 0.02 | 0.12 |
| 14 | 0.02 | 0.00 | 0.01 | 0.000 | 0.04 | 0.02 | 0.00 | 0.14 |
| 15 | 0.01 | 0.00 | 0.01 | 0.002 | 0.04 | 0.04 | 0.00 | 0.12 |
| 16 | 0.01 | 0.00 | 0.00 | 0.001 | 0.02 | 0.02 | 0.00 | 0.10 |

Reactor Gassing of Synthetic Grain Conditions

EXPERIMENT A

The following process parameters were used.
Temperature Range=1125, 1155, 1175° C.
AHCl flow=60% on Gilmont #5
Nitrogen flow=60% on Gilmont #5
Nitrogen purge to feed tote=on
Nitrogen purge to feed tube nitrogen=on
Feed Rate=0.1 lb/min.
Reactor RPM range=1.0 to 2.0

EXPERIMENT B

Temperature Range 1125, 1155, 1175° C.
AHCl flow=60% on Gilmont #5
Nitrogen flow=30% on Gilmont #5
Nitrogen purge to feed tote 130 on tote flowmeter
Nitrogen purge to feed tube=50 on feed flowmeter
Feed Rate=0.1 lb/min.
Reactor RPM range=1.0 to 2.0

All experiments were operated with grain poured into the feed tote and purged overnight. This technique was effective at ensuring grain has been completely purged of ambient air contamination.

Excellent results have been observed for these experiments, and are set forth in Table 2.

TABLE 2

ICP ANALYSIS

| Experiment | Sampling Sequence | | | | | | | | |
|---|---|---|---|---|---|---|---|---|---|
| | Al | Ba | Ca | Cr | Cu | Fe | Ge | K | Li |
| A1 | 0.10 | 0.00 | 0.02 | 0.00 | 0.00 | 0.06 | 0.01 | 0.01 | 0.001 |
| A2 | 0.11 | 0.00 | 0.00 | 0.00 | 0.00 | 0.03 | 0.01 | 0.01 | 0.000 |
| A3 | 0.24 | 0.00 | 0.05 | 0.00 | 0.00 | 0.01 | 0.07 | 0.01 | 0.001 |
| A4 | 0.38 | 0.00 | 0.08 | 0.00 | 0.00 | 0.02 | 0.02 | 0.01 | 0.000 |
| B1 | 0.05 | 0.00 | 0.18 | 0.00 | 0.00 | 0.03 | 0.01 | 0.01 | 0.000 |
| B2 | 0.05 | 0.00 | 0.07 | 0.00 | 0.00 | 0.02 | 0.01 | 0.01 | 0.000 |
| B3 | 0.02 | 0.00 | 0.02 | 0.00 | 0.00 | 0.00 | 0.00 | 0.00 | 0.000 |
| B4 | 0.04 | 0.00 | 0.06 | 0.00 | 0.00 | 0.00 | 0.01 | 0.00 | 0.000 |
| B5 | 0.07 | 0.00 | 0.03 | 0.00 | 0.00 | 0.01 | 0.02 | 0.00 | 0.000 |
| B6 | 0.19 | 0.00 | 0.02 | 0.00 | 0.00 | 0.00 | 0.02 | 0.01 | 0.000 |

| Experiment | Sampling Sequence | | | | | | | | |
|---|---|---|---|---|---|---|---|---|---|
| | Mg | Mn | Na | Ni | P | Sr | Ti | Zn | Zr |
| A1 | 0.06 | 0.00 | 0.02 | 0.000 | 0.01 | 0.00 | 0.02 | 0.03 | 0.08 |
| A2 | 0.03 | 0.00 | 0.02 | 0.000 | 0.02 | 0.00 | 0.02 | 0.03 | 0.09 |
| A3 | 0.05 | 0.00 | 0.03 | 0.001 | 0.03 | 0.00 | 0.04 | 0.03 | 0.12 |
| A4 | 0.02 | 0.00 | 0.02 | 0.000 | 0.01 | 0.00 | 0.04 | 0.02 | 0.07 |
| B1 | 0.04 | 0.00 | 0.00 | 0.001 | 0.00 | 0.00 | 0.01 | 0.01 | 0.03 |
| B2 | 0.01 | 0.00 | 0.01 | 0.000 | 0.01 | 0.00 | 0.02 | 0.00 | 0.05 |

TABLE 2-continued

ICP ANALYSIS

| | | | | | | | | | |
|---|---|---|---|---|---|---|---|---|---|
| B3 | 0.01 | 0.00 | 0.01 | 0.000 | 0.01 | 0.00 | 0.00 | 0.00 | 0.03 |
| B4 | 0.00 | 0.00 | 0.00 | 0.000 | 0.01 | 0.00 | 0.01 | 0.00 | 0.04 |
| B5 | 0.02 | 0.00 | 0.00 | 0.000 | 0.02 | 0.00 | 0.02 | 0.00 | 0.10 |
| B6 | 0.01 | 0.00 | 0.00 | 0.000 | 0.01 | 0.00 | 0.01 | 0.08 | 0.08 |

The present invention has been described with reference to the preferred embodiments. Obviously, modifications and alterations will occur to others upon reading and understanding the preceding detailed description. It is intended that the present invention be construed as including all such modifications and alterations insofar as they come within the scope of the appended claims or the equivalents thereof.

The invention claimed is:

1. A process for the continuous production of silica in a rotatable tube reactor comprising:
providing a rotatable rotary tube reactor, said rotatable rotary tube reactor having a first end, a second opposite end, and a wall extending at least partially between said first and second ends, said first and second ends and said wall defining an interior reaction region, said rotary tube reactor including a silica feed end located at or proximate said first end and a process gas feed end located at or proximate said second end, said rotary tube reactor including a plurality of reactor plates positioned and secured within an interior of said rotary tube reactor, at least two of said plates designed to enable said silica feed to pass between an outer edge of said at least two plates and an interior surface of said rotary tube, wherein at least one of said reactor plates includes a plurality of outwardly extending fins;
providing a source of silica feed in communication with said first end of said rotary tube reactor;
providing a source of at least one process gas in communication with said second end of said rotary tube reactor;
inserting said silica feed into said silica feed end of said rotary tube reactor;
inserting at least one process gas into said second end of said rotary tube reactor;
causing said silica feed to move into said interior reaction region of said rotary tube reactor whereby said silica feed and said at least one process gas are retained within said interior reaction region of said rotary tube reactor for a sufficient time so that at least a portion of impurities in said silica feed react with said at least one process gas and are removed from said silica feed.

2. The process as defined in claim 1, including the step of heating said interior reaction region of said rotary tube reactor to a temperature of at least about 900° C.

3. The process as defined in claim 2, wherein said interior reaction region of said rotary tube reactor is heated to a temperature of up to about 1400° C.

4. The process as defined in claim 1, wherein said rotary tube reactor is rotated to at least partially cause silica feed to move into said interior reaction region of said rotary tube reactor.

5. The process as defined in claim 1, wherein said rotary tube reactor is rotated at a rate of at least about 0.5 rpm.

6. The process as defined in claim 1, wherein said rotary tube reactor is rotated at a rate of up to about 12 rpm.

7. The process as defined in claim 1, including the step of providing at least one anoxic gas and introducing said at least one anoxic gas interior reaction region of said rotary tube reactor to at least partially remove or exclude oxygen from said interior reaction region of said rotary tube reactor.

8. The process as defined in claim 1, wherein said silica feed is retained within said interior reaction region of said rotary tube reactor for at least about 15 minutes.

9. The process as defined in claim 8, wherein said silica feed is retained within said interior reaction region of said rotary tube reactor for up to about 120 minutes.

10. The process as defined in claim 1, wherein said plurality of reactor plates include a first reactor plate positioned proximate said first end of said rotary tube reactor and a second reactor plate positioned proximate said second end of said rotary tube reactor.

11. The process as defined in claim 1, wherein said plurality of reactor plates include first, second and third reactor plates positioned and secured within an interior of said rotary tube reactor, said first reactor plate positioned proximate to said first end of said rotary tube reactor, said second reactor plate positioned proximate said second end of said rotary tube reactor, said third reactor plate positioned proximate to said second end of said rotary tube reactor and alongside said second reactor plate.

12. The process as defined in claim 11, wherein said second and third reactor plates each includes a centrally disposed aperture.

13. The process as defined in claim 1, wherein said rotary tube reactor is oriented at an angle of inclination of at least about 0.5 degrees.

14. The process as defined in claim 3, wherein said at least one process gas includes an acid.

15. The process as defined in claim 14, wherein said at least one process gas includes a chlorine compound.

16. The process as defined in claim 15, wherein said at least one process gas includes anhydrous hydrogen chloride.

17. The process as defined in claim 1, wherein at least one anoxic gas is directed into said interior of said rotary tube reactor.

18. The process as defined in claim 17, including the step of providing a gas injector designed to at least partially provide said at least one process gas into said interior of said rotary tube reactor and to at least partially provide said at least one anoxic gas into said interior of said rotary tube reactor.

19. The process as defined in claim 17, wherein said anoxic gas includes nitrogen.

20. The process as defined in claim 1, wherein said rotary tube reactor having a length and said silica feed having a feed speed such that said silica feed is retained within said interior of said rotary tube reactor a residence time of at least about 15 seconds.

21. The process as defined in claim 1, wherein said rotary tube reactor is designed to rotate at a rate of at least about 0.5 rpm.

22. The process as defined in claim 1, including a furnace designed to at least partially heat said wall of said rotary tube reactor.

23. A process for the continuous production of silica in a rotatable tube reactor comprising:
providing a rotatable rotary tube reactor, said rotatable rotary tube reactor having a first end, a second opposite end, and a wall extending at least partially between said first and second ends, said first and second ends and said wall defining an interior reaction region, said rotary tube reactor including a silica feed end located at or proximate said first end and a process gas feed end located at or proximate said second end, said rotary tube reactor including a plurality of reactor plates positioned and secured within an interior of said rotary tube reactor, at least two of said plates designed to enable said silica feed to pass between an outer edge of said at least two plates and an interior surface of said rotary tube;

providing a source of silica feed in communication with said first end of said rotary tube reactor;

providing a source of at least one process gas in communication with said second end of said rotary tube reactor;

inserting said silica feed into said silica feed end of said rotary tube reactor;

inserting at least one process gas into said second end of said rotary tube reactor;

inserting said at least one anoxic gas into a plurality of different locations in said interior region of said rotary tube reactor causing said silica feed to move into said interior reaction region of said rotary tube reactor whereby said silica feed and said at least one process gas are retained within said interior reaction region of said rotary tube reactor for a sufficient time so that at least a portion of impurities in said silica feed react with said at least one process gas and are removed from said silica feed.

24. The process as defined in claim 23, wherein said anoxic gas is present within at least a portion of said interior region of said rotary tube reactor at a pressure greater than atmospheric pressure to thereby promote exclusion of oxygen from at least a portion of said interior region of said rotary tube reactor.

25. The process as defined in claim 24, wherein said pressure of said anoxic gas within at least a portion of said interior region of said rotary tube reactor is up to about 5 psi gauge.

26. The process as defined in claim 25, wherein said pressure of said anoxic gas feed is from about 16-30 psi gauge.

27. A process for the continuous production of silica in a rotatable tube reactor comprising:

providing a rotatable rotary tube reactor, said rotatable rotary tube reactor having a first end, a second opposite end, and a wall extending at least partially between said first and second ends, said first and second ends and said wall defining an interior reaction region, said rotary tube reactor including a silica feed end located at or proximate said first end and a process gas feed end located at or proximate said second end, said rotary tube reactor including a plurality of reactor plates positioned and secured within an interior of said rotary tube reactor, at least two of said plates designed to enable said silica feed to pass between an outer edge of said at least two plates and an interior surface of said rotary tube;

providing a source of silica feed in communication with said first end of said rotary tube reactor;

providing a source of at least one process gas in communication with said second end of said rotary tube reactor;

providing a gas injector designed to at least partially provide said at least one process gas into said interior of said rotary tube reactor and to at least partially provide said at least one anoxic gas into said interior of said rotary tube reactor, wherein said gas injector at least partially disposed in said rotary tube reactor, said gas injector designed to introduce said at least one process gas is introduced into an interior region of said rotary tube reactor, said gas injector also designed to introduce said at least one anoxic gas proximate said second end of said rotary tube reactor to thereby prevent ambient gases from entering said rotary tube reactor, said gas injector introducing said at least one process gas and said at least one anoxic gas proximate at different locations in said rotary tube reactor;

inserting said silica feed into said silica feed end of said rotary tube reactor;

inserting at least one process gas into said second end of said rotary tube reactor;

causing said silica feed to move into said interior reaction region of said rotary tube reactor whereby said silica feed and said at least one process gas are retained within said interior reaction region of said rotary tube reactor for a sufficient time so that at least a portion of impurities in said silica feed react with said at least one process gas and are removed from said silica feed.

* * * * *